United States Patent
Miao

(10) Patent No.: US 7,305,057 B1
(45) Date of Patent: Dec. 4, 2007

(54) MULTICHANNEL FILTER-BASED HANDHELD ULTRA WIDEBAND COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 922 days.

(21) Appl. No.: 10/614,139

(22) Filed: Jul. 7, 2003

(51) Int. Cl.
   *H04B 1/10* (2006.01)
(52) U.S. Cl. ............... 375/350; 370/206; 370/208; 375/135; 375/260; 375/367; 455/41.2
(58) Field of Classification Search ........... 375/350; 370/206, 208; 708/322; 342/150; 455/41.2, 455/445
   See application file for complete search history.

(56) References Cited

U.S. PATENT DOCUMENTS 5,272,656 A * 12/1993 Genereux .............. 708/322
6,128,276 A * 10/2000 Agee ................... 370/208
6,175,550 B1 * 1/2001 van Nee ................ 370/206

OTHER PUBLICATIONS

Ronald Crochiere & Lawrence Rabiner; Multirate Digital Signal Processing; 1983; Prentice-Hall (pp. 252-260, 290-300).*
Tewfik et al.; High Bit Rate Ultra-Wideband OFDM; Nov. 17-21, 2002; IEEE Globecom 2002; pp. 2260-2264.*
McClellan et al; A Unified Approach to the Design of Optimum FIR Linear Phase Digital Filters; Nov. 1973; IEEE Transactions on Circuit Theory; pp. 697-701.*
College of Engineering; University of California, Riverside; EE 141 Digital Signal Processing Laboratory Instruction.*

* cited by examiner

Primary Examiner—David C. Payne
Assistant Examiner—Adolf DSouza

(57) ABSTRACT

A multichannel filter-based handheld UWB communication transceiver is presented for outdoor operations. Using eleven multichannels with multicarrier modulations, the invented handheld UWB communication transceiver can transmit and receive UWB signals at a data rate up to 7.15 Gcps with scalability capabilities. In addition, the handheld UWB communication transceiver can be controlled in a programmable way to avoid interference with WLAN devices.

19 Claims, 17 Drawing Sheets

MULTICHANNEL FILTER-BASED HANDHELD ULTRA WIDEBAND COMMUNICATIONS

BACKGROUND

This invention is generally relative to wireless outdoor handheld ultra wideband communications.

On Apr. 22, 2002, U.S. Federal Communications Commission (FCC) released the revision of Part 15 of the Commission's rules regarding ultra-wideband (UWB) transmission systems to permit the marketing and operation of certain types of new products incorporating UWB technology. With appropriate technology, UWB device can operate using spectrum occupied by existing radio service without causing interference, thereby permitting scarce spectrum resources to be used more efficiently. It has been known that UWB technology offers significant benefits for Government, public safety, businesses and consumers under an unlicensed basis of operation spectrum.

UWB devices can be classified in three types based on the operating restrictions: (1) imaging system including ground penetrating radars and wall, through-wall, surveillance, and medical imaging device, (2) vehicular radar systems, and (3) communications and measurement systems. In general, FCC is adapting unwanted emission limits for UWB devices that are significantly more stringent than those imposed on other Part 15 devices. In other words, FCC limits outdoor use of UWB devices to imaging systems, vehicular radar systems and handheld devices. Limiting the frequency band, which is based on the −10 dB bandwidth of the UWB emission, within certain UWB products will be permitted to operate.

The outdoor handheld UWB systems are intended to operate in a peer-to-peer mode without restriction on location. The handheld UWB device must operate in the frequency band from 3.1 GHz to 10.6 GHz, with an extremely conservative out of band emission mask to address interference with other devices. The handheld UWB devices are permitted to emit at or below the Part 15.209 limit in the frequency band below 960 MHz. The emissions above 960 MHz must conform to the following emissions mask as shown in Table 1:

TABLE 1

| Frequency (MHz) | EIRP (dBm) |
|---|---|
| 0-960 | −41.3 |
| 960-1610 | −75.3 |
| 1610-1900 | −63.3 |
| 1900-3100 | −61.3 |
| 3100-10600 | −41.3 |
| Above 10600 | −61.3 |

FCC proposed to define a UWB device as any device where the fractional bandwidth is greater than 0.25 based on the formula as follows:

$$FB = 2\left(\frac{f_H - f_L}{f_H + f_L}\right), \quad (1)$$

where $f_H$ is the upper frequency of the −10 dB emission point and $f_L$ is the lower frequency of the −10 dB emission point. The center frequency of the UWB transmission is defined as the average of the upper and lower −10 dB points as follows:

$$F_c = \frac{f_H + f_L}{2}. \quad (2)$$

In addition, a minimum frequency bandwidth of 500 MHz must be used for an UWB device regardless of center frequency.

Given an entire frequency bandwidth of 7.5 GHz (3.1-10.6 GHz), it is difficult to design a transmitter and/or receiver device for a single UWB signal that occupies the entire frequency bandwidth from 3.1 GHz to 10.6 GHz directly. This is because we need to have a very-high speed A/D and D/A converter as well as a high-speed circuit and digital signal processor to operate an UWB device for the wireless communications. As a result, the cost of the UWB device could be expense. In addition, interference between the UWB and other devices, such as a WLAN 802.11a device, can occur because the WLAN 802.11a device operates in the lower frequency range from 5.15 GHz to 5.35 GHz or in the upper frequency range from 5.725 GHz to 5.825 GHz. Moreover, the UWB device may not be able to transmit data with scalability.

Due to the proliferation of 7.5 GHz UWB for wireless broadband communications, it would be desirable to have a new technology of developing one multichannel UWB solution with a scalability of the transmission data rate, which not only reduces the interference with WLAN 802.11a devices but also has a lower cost for an outdoor handheld UWB transceiver. The multichannel UWB solution highly depends on a multichannel filter, which must meet the FCC request of the outdoor emission limitation, to provide the multichannel-based multi-carrier modulation. Therefore, in this embodiment, the multichannel filter-based outdoor handheld ultra wideband communications is invented for wireless broadband communications.

Thus, there is a continuing need of the multichannel filter-based outdoor handheld UWB transceivers that enables a user to transmit the data rate with programmability and scalability and avoid the interference with WLAN 802.11a devices.

DETAILED DESCRIPTION

Some embodiments described herein are directed to a multichannel filter-based handheld UWB communications for outdoor operation. The outdoor handheld UWB communication system may be implemented in hardware, such as in an Application Specific Integrated Circuits (ASIC), digital signal processor, field programmable gate array (FPGA), software, or a combination of hardware and software.

Figure 1:
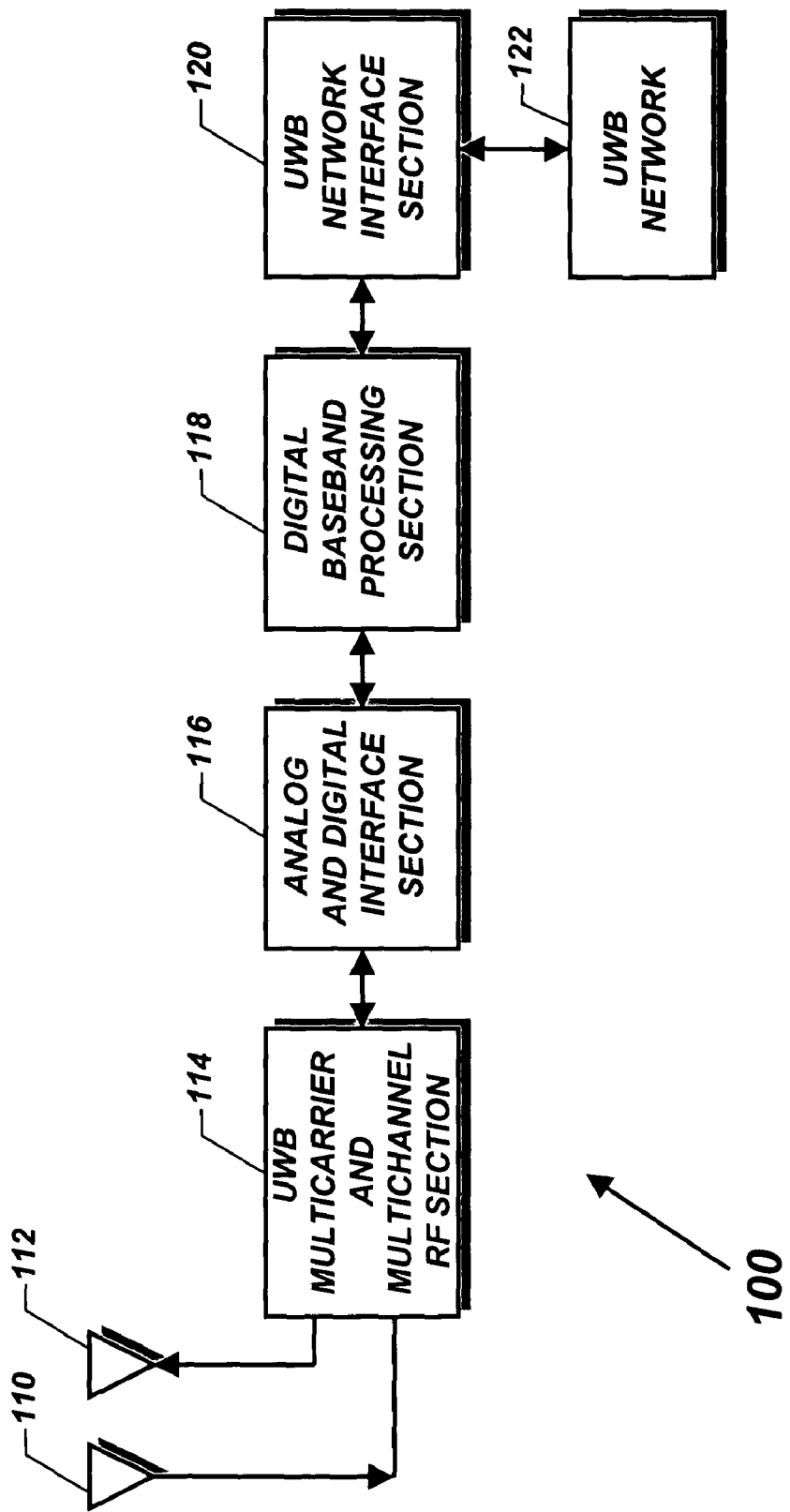
FIG. 1 shows a block diagram of one embodiment of a multichannel filter-based outdoor handheld UWB communication system in accordance with the present invention.

A multichannel filter-based handheld UWB communication transceiver 100 for outdoor operations is shown in FIG. 1 in accordance with one embodiment of the present invention. This outdoor handheld UWB transceiver 100 contains a UWB multi-carrier and multichannel RF section 114 that receives and/or transmits multichannel-based UWB signals from an antenna 110 or to an antenna 112. The section 114 is coupled to an analog and digital interface section 116 that includes A/D and D/A converters. The interface section 116 is also connected with a digital baseband processing section 118 that implements multichannel digital filtering, rake processing, spread and de-spread processing, interleaver and de-interleaver, and code and de-code processing. The digital baseband processing section 118 has an interface with a UWB network interface section 120, which is coupled to a UWB network 122. In accordance with one embodiment of the present invention, the UWB communication transceiver 100 is used for the outdoor handheld UWB communications that can both transmit and receive speech, audio, images and video and data information with programmability and scalability.

The handheld UWB communication transceiver 100 can transmit and/or receive the UWB signals by using one single channel and/or up to 11-multichannel. Each channel has a frequency bandwidth of 650 MHz. The UWB transceiver 100 can transmit 40.625 Msps with a single channel. A total of 11-multichannel can allow the UWB transceiver 100 to transmit 446.875 Msps in parallel. With 16 PN spread sequence codes for each symbol, the UWB transceiver 100 can transmit 650 Mcps within each channel. As a result, the handheld UWB communication transceiver 100 can transmit and/or the chip data rate up to 7.150 Gcps for the outdoor operation.

Figure 2:
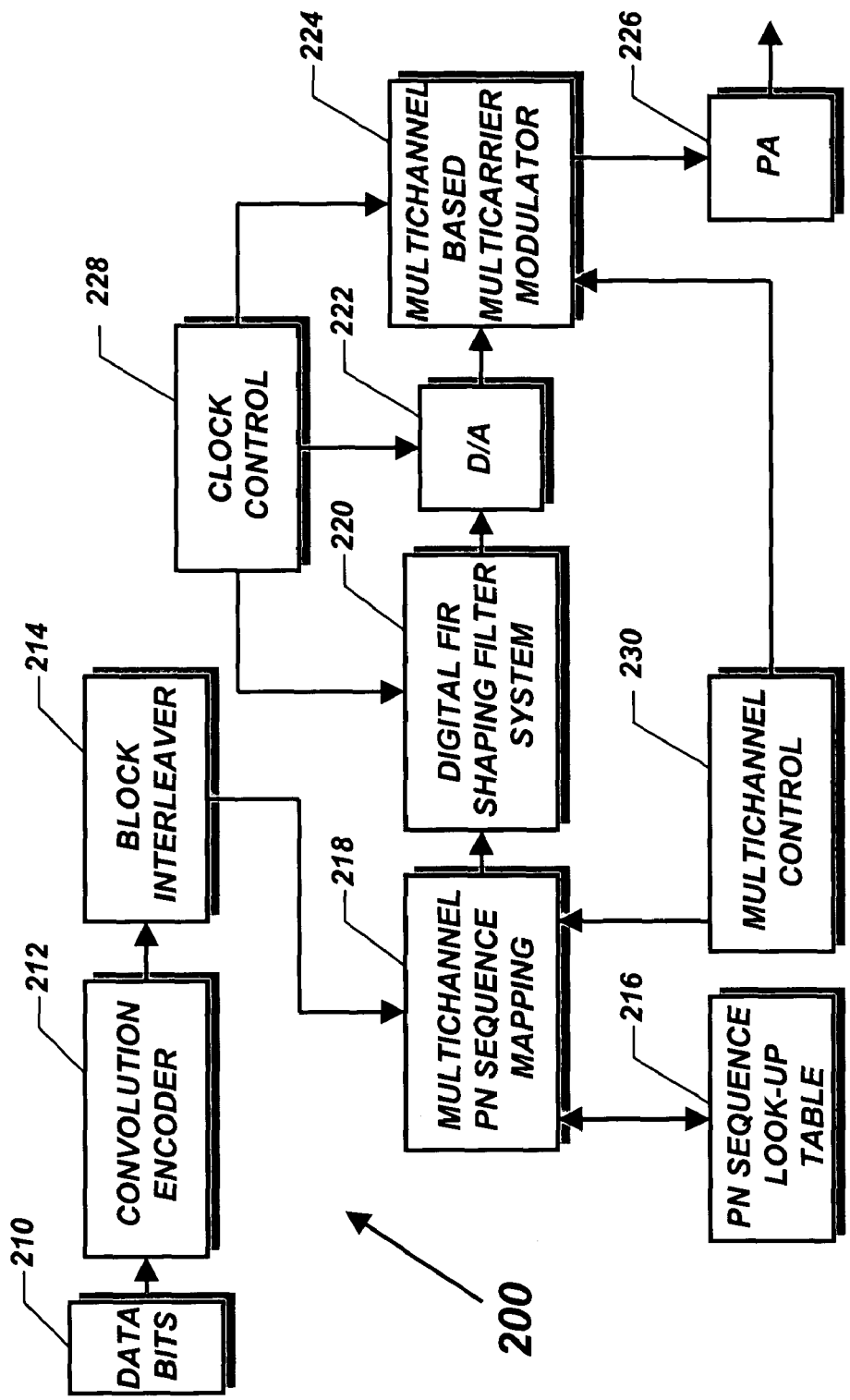
FIG. 2 is a block diagram of a multichannel filter-based UWB transmitter of outdoor handheld UWB transceiver according to some embodiments.

FIG. 2 is a block diagram of a multichannel filter-based UWB transmitter 200 of the outdoor handheld UWB transceiver according to some embodiments. The UWB transmitter 200 receives user data bits 210 with information data rate of 223.4375 Mbps. The information data bits 210 are passed through a ½-rate convolution encoder 212 that may produce a double data rate of 446.875 Msps by adding redundancy bits. The symbol data is then interleaved by using a block interleaver 214. Thus, the output symbols of the block interleaver 214 are formed the 11-multichannel UWB signal by using a multichannel PN sequence mapping 218. Each channel has the symbol data rate of 40.625 Msps. The multichannel PN sequence mapping 218 is to perform spreading for each channel symbol data with 16 orthogonal spread sequence chips and to produce 650 Mcps for each channel under a multichannel control 230. A PN sequence look-up table 216 provides the unique orthogonal sequences for each channel spreading. Then each channel symbol data are sequentially passed through a digital FIR shaping filter system 220 to limit the frequency bandwidth of UWB signal with 650 MHz for each channel transmission. Each channel signal is then passed through a D/A converter 222. The output chip data of each channel from the D/A converter 222 is thus modulated with a multi-carrier by using a multichannel based multi-carrier modulator 224. Then, the output analog signals of the multichannel-based multi-carrier modulator 224 are passed to the power amplifier (PA) 226 through an antenna into air.

Figure 3:
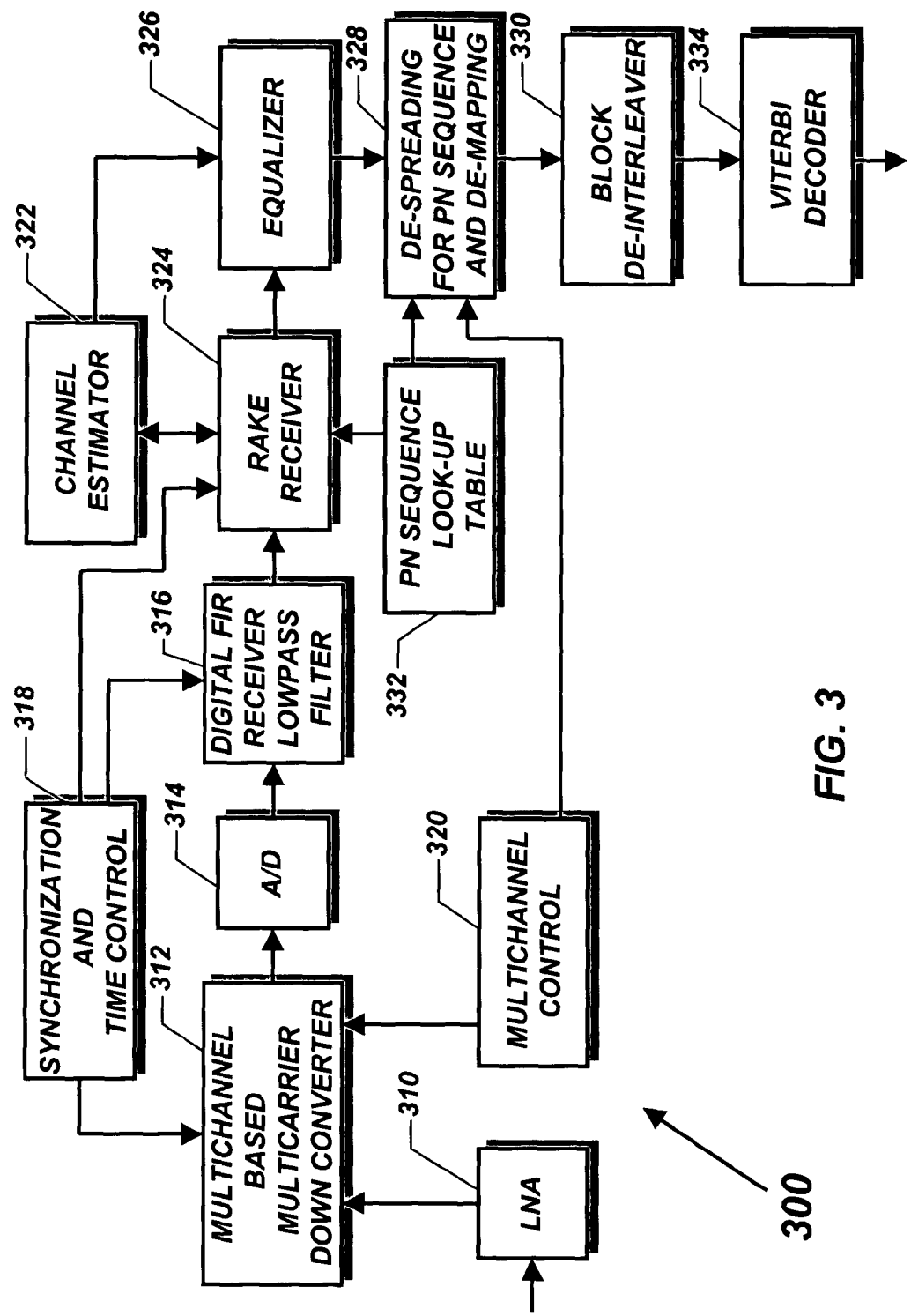
FIG. 3 is a block diagram of a multichannel filter-based UWB receiver of outdoor handheld UWB transceiver according to some embodiments.

FIG. 3 is a block diagram of a multichannel filter-based outdoor handheld UWB receiver 300 according to some embodiments. A low noise amplifier (LNA) 310 that is connected with a multichannel-based multi-carrier down converter 312 receives the UWB signals from an antenna. The output of the LNA 310 is passed through the multichannel-based multi-carrier down converter 312 to produce the baseband signal for an A/D converter 314. A multichannel control 320 and synchronization and time control 318 restrain the multichannel-based multi-carrier down converter 312. The bandlimited UWB analog signals are then sampled and quantized by using the A/D converter 314, with the sampling rate at ≧650 MHz. The digital signals of the output of the A/D converter 314 are filtered by using a digital FIR receiver lowpass filter 316 to remove the out of band signals with controlling from the synchronization and time control 318. The output data from the digital FIR receiver lowpass filter 316 is used for a rake receiver 324. The channel estimator 322 is used to estimate the channel phase and frequency that are passed into the rake receiver 324. The rake receiver 324 calculates the correlation between the received UWB signals and the channel spread sequences, which are provided by using the PN sequence look-up table 332, and performs coherent combination. The output of the rake receiver 324 is passed to an equalizer 326, which also receives the information from the channel estimator 322, to eliminate inter-symbol interference (ISI) and inter-channel interference (ICI). Then, the output of the equalizer 326 produces the signals for a de-spreading of PN sequence and de-mapping 328 to form the UWB signals of symbol rate at 446.875 Msps. The symbol data is de-interleaved by using a block de-interleaver 330. Thus, the output data of the block de-interleaver 330 is used for the Viterbi decoder 334 to decode the encoded data and to produce the information data bits at 223.4375 Mbps.

Figure 4:
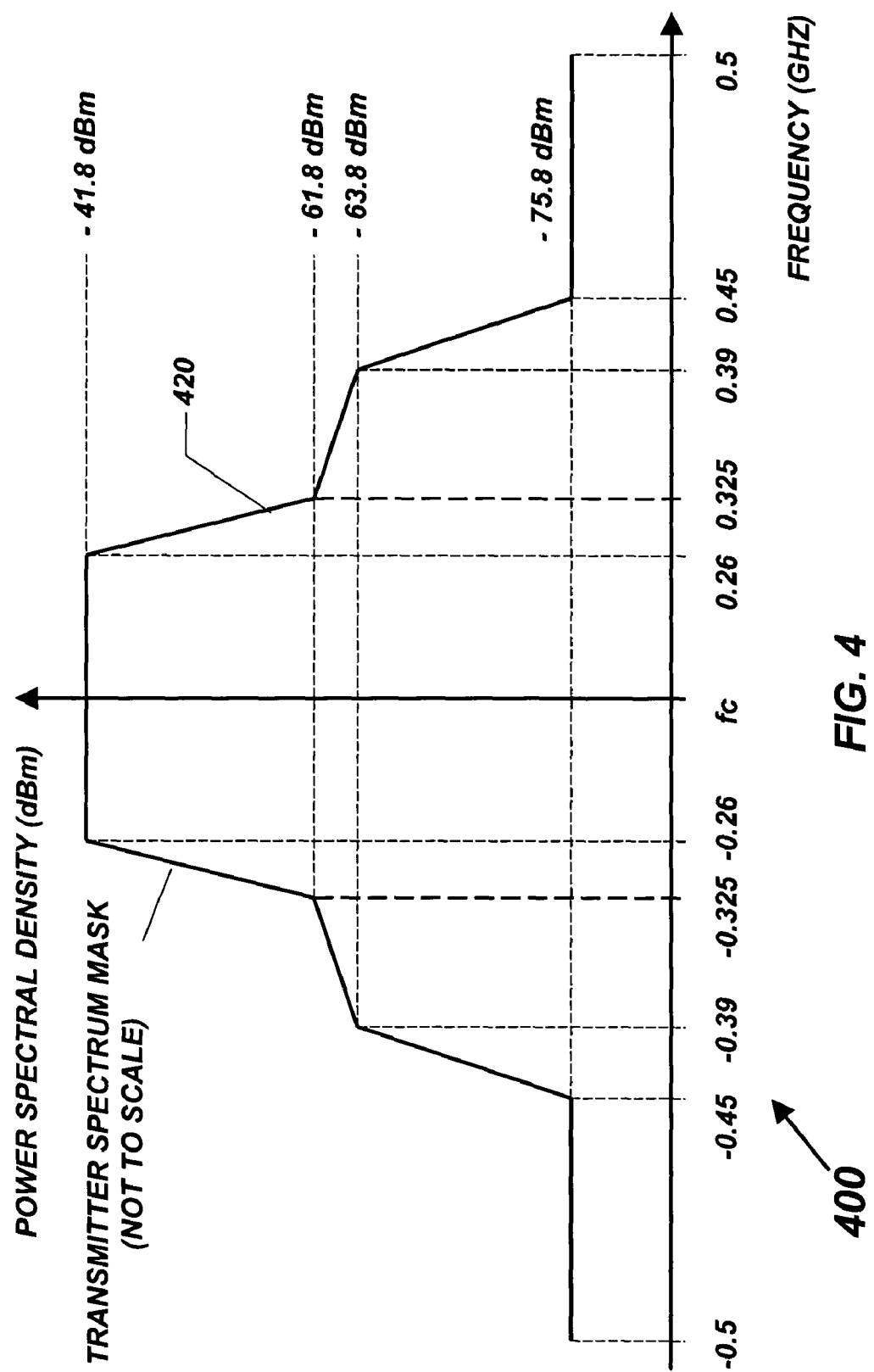
FIG. 4 is a transmitter spectrum mark of an outdoor power spectral density according to some embodiments.

FIG. 4 is a transmitter spectrum mark 420 of the outdoor power spectral density 400 for the use in the each channel filter according to some embodiments. The magnitudes (dBm) of the frequency response with an error of $\pm\delta_i$ (i=1, 2, 3, 4) for corresponding frequencies (GHz) are given by, $$(-41.8-\delta_i) \leq |H(f)| \leq (-41.8+\delta_1), \; |f-f_c| \leq 0.26, \quad (3)$$

$$|H(f)| \leq (-61.8+\delta_2), \; |f-f_c|=0.325, \quad (4)$$

$$|H(f)| \leq (-63.8+\delta_3), \; |f-f_c|=0.39, \quad (5)$$

$$|H(f)| \leq (-75.8+\delta_4), \; 0.45 \leq |f-f_c| \leq 0.5. \quad (6)$$

The transmitter spectrum mark 420 serves as a rule for designing a digital FIR lowpass-shaping transmitter and/or receiver filters.

Figure 5:
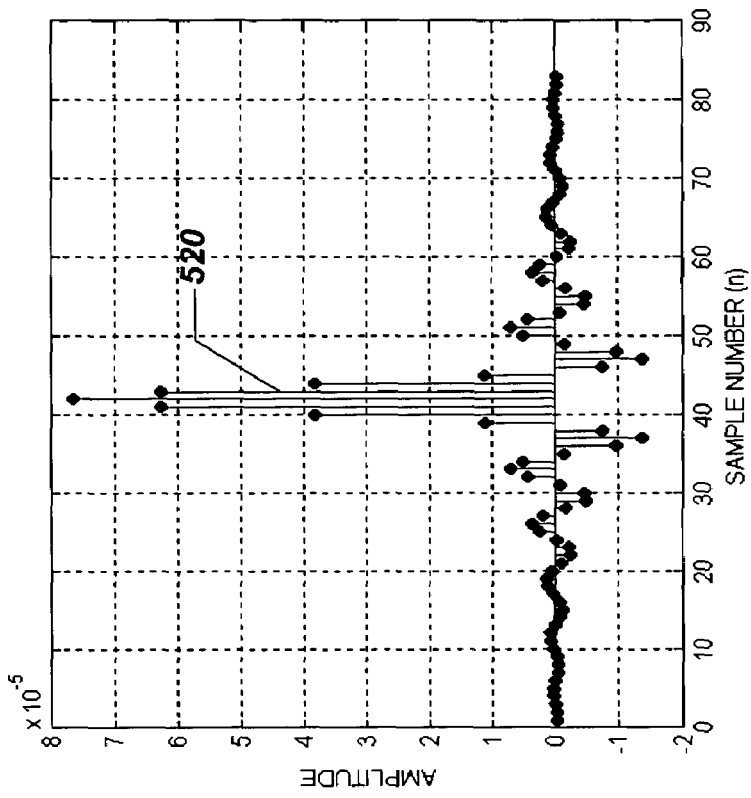
FIG. 5 is a frequency and impulse response of a digital FIR lowpass-shaping filter for use in the transmitter and/or receiver according to one embodiment.
Figure 5:
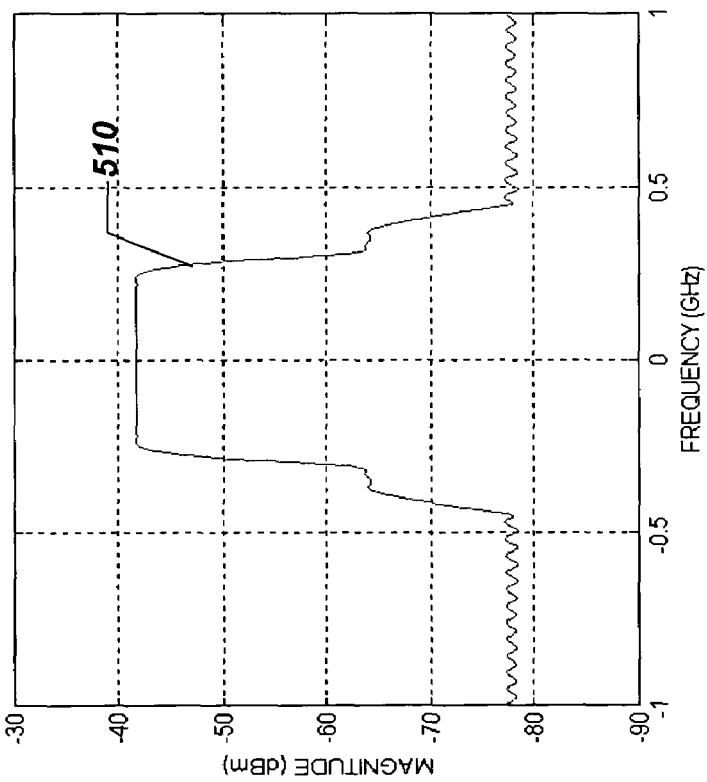

Referring to FIG. 5 is a frequency response (dBm) 510 and impulse response 520 of digital FIR lowpass-shaping transmitter and/or receiver filter 500 based on the transmitter spectrum mask 420 in FIG. 4 for the use in each channel according to one embodiment. The result of designing the digital FIR lowpass-shaping filter 520 does meet the requirements of the transmitter spectrum mask 420 of the outdoor power spectrum density 400 as defined in FIG. 4. The sampling frequency rate $F_s$ of this filter is 2 GHz. This impulse response 520 of the digital FIR lowpass-shaping filter is an even coefficient symmetric about h[0] at n=0 with a total of 83 filter coefficients. Table 2 lists all the filter coefficients of the digital FIR lowpass-shaping filter.

TABLE 2

| Coefficients | Value |
|---|---|
| h[0] | 7.6488735705936605e-005 |
| h[−1], h[1] | 6.2636205884599369e-005 |
| h[−2], h[2] | 3.8360738472336015e-005 |
| h[−3], h[3] | 1.1315222826039952e-005 |
| h[−4], h[4] | −7.5438087863256088e-006 |
| h[−5], h[5] | −1.3715350107903802e-005 |
| h[−6], h[6] | −9.6549464333329795e-006 |
| h[−7], h[7] | −1.4025569435129311e-006 |
| h[−8], h[8] | 5.3003810907673923e-006 |
| h[−9], h[9] | 7.2459334117828691e-006 |
| h[−10], h[10] | 4.3825454945279616e-006 |
| h[−11], h[11] | −7.3762240948801741e-007 |
| h[−12], h[12] | −4.5458747488001017e-006 |
| h[−13], h[13] | −4.7131566336279298e-006 |
| h[−14], h[14] | −1.6403017957724223e-006 |
| h[−15], h[15] | 2.0411082705529443e-006 |
| h[−16], h[16] | 3.6642171169389545e-006 |
| h[−17], h[17] | 2.4832733363889074e-006 |
| h[−18], h[18] | −1.2626402560439206e-007 |
| h[−19], h[19] | −2.1121354877069656e-006 |
| h[−20], h[20] | −2.3106300667210457e-006 |
| h[−21], h[21] | −9.9696474129624093e-007 |
| h[−22], h[22] | 6.8001098631267257e-007 |
| h[−23], h[23] | 1.6055470083229580e-006 |
| h[−24], h[24] | 1.3544197859980424e-006 |
| h[−25], h[25] | 2.8906713844065611e-007 |
| h[−26], h[26] | −7.7640460252440758e-007 |
| h[−27], h[27] | −1.1590268443143087e-006 |
| h[−28], h[28] | −7.2082016980864959e-007 |
| h[−29], h[29] | 1.0449113646872343e-007 |
| h[−30], h[30] | 7.0581527869524552e-007 |
| h[−31], h[31] | 7.2894825863413297e-007 |
| h[−32], h[32] | 2.7772069871654161e-007 |
| h[−33], h[33] | −2.5824128353050490e-007 |
| h[−34], h[34] | −5.0913724964550914e-007 |
| h[−35], h[35] | −3.7669532172385286e-007 |
| h[−36], h[36] | −3.2564239303970273e-008 |
| h[−37], h[37] | 2.4370835675220430e-007 |
| h[−38], h[38] | 2.9201867311458947e-007 |
| h[−39], h[39] | 1.4137476178313894e-007 |
| h[−40], h[40] | −5.5504489846808052e-008 |
| h[−41], h[41] | −1.7766983155229356e-007 |

The digital FIR lowpass-shaping filter may be designed using the least square method with weighting function for each frequency band. Other techniques such as equiripple approximations and windowing may also be used.

The implementation output y[n] of the digital FIR lowpass-shaping filter with 83 even symmetric coefficients can be expressed as, $$y[n] = \sum_{k=0}^{82} h[n]x[n-k], \quad (7)$$

where h[n] is a set of the digital FIR lowpass-shaping filter coefficients as shown in Table 2 and x[n] is the digital input signal. Since the digital FIR lowpass-shaping filter 520 is even symmetric coefficients, the above equation (7) can be rewritten as $$y[n] = \sum_{k=0}^{40} h[n](x[n-k] + x[n-82+k]) + h[42]x[n-42]. \quad (8)$$

The equation (8) can be implemented with saving half taps of the computation. The computation complexity of implementing this digital FIR lowpass-shaping filter in equation (8) is 42 multiplications and 82 additions.

Figure 6:
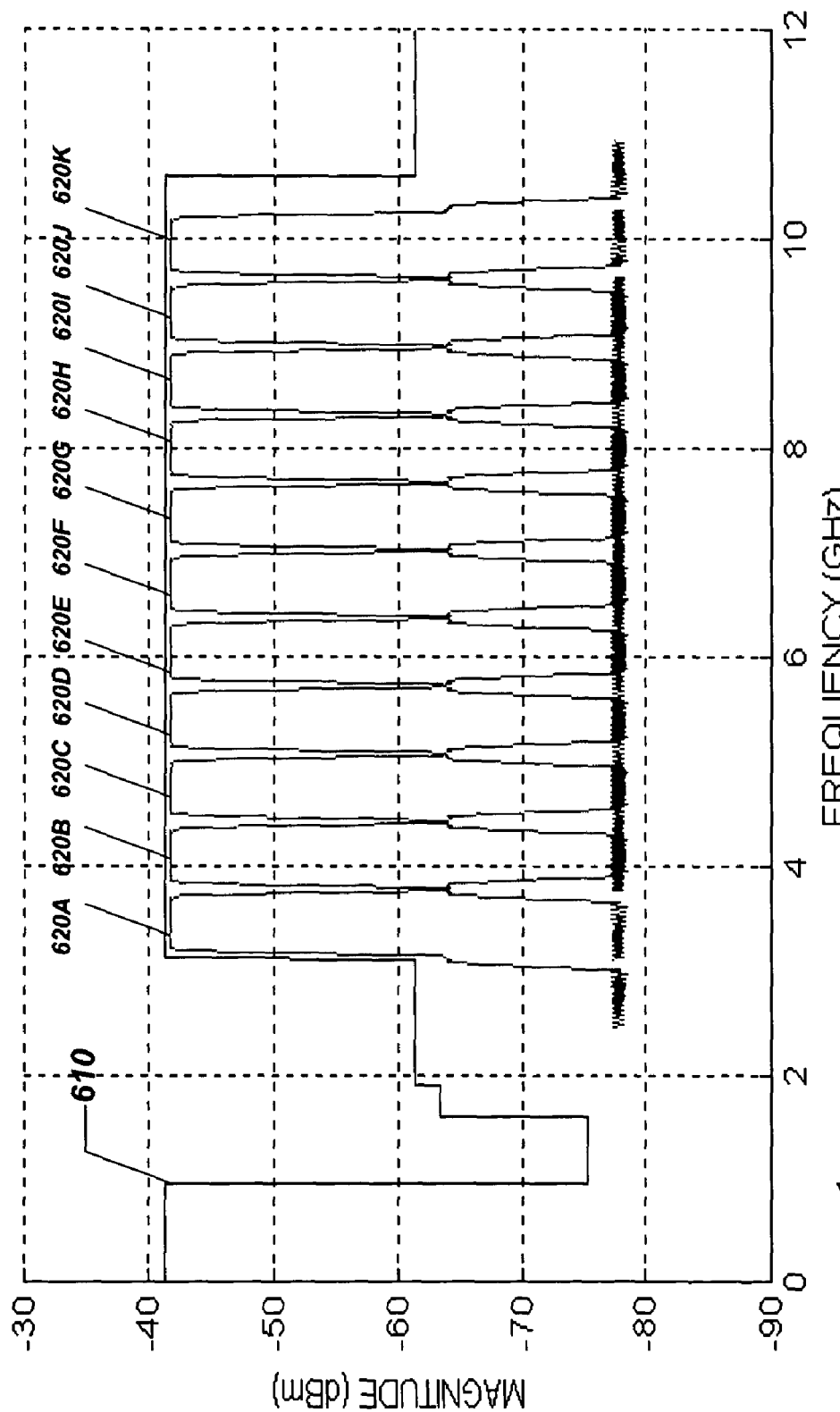
FIG. 6 is a frequency spectrum of 11 multichannel spectrums and outdoor FCC emission limit according to some embodiments.

Referring to FIG. 6, which is an output of a multichannel spectrum (dBm) with multi-carrier frequencies 600 including 11-transmitter channel spectrums 620A-620K and the outdoor FCC emission limitation 610 according to some embodiments. Each channel frequency bandwidth is 650 MHz with different carrier frequencies, and is fitted under the outdoor FCC emission limitation 610. The detail positions of each transmitter channel spectrums (dBm) along with the center, lower and upper frequencies (GHz) as well as channel frequency bandwidth (MHz) are listed in Table 3.

TABLE 3

| Label of the channel frequency spectrums | Center Frequency (GHz) | Lower Frequency (GHz) | Upper Frequency (GHz) | Frequency Bandwidth (MHz) |
|---|---|---|---|---|
| 620A | 3.45 | 3.125 | 3.775 | 650 |
| 620B | 4.10 | 3.775 | 4.425 | 650 |
| 620C | 4.75 | 4.425 | 5.075 | 650 |
| 620D | 5.40 | 5.075 | 5.725 | 650 |
| 620E | 6.05 | 5.725 | 6.375 | 650 |
| 620F | 6.70 | 6.375 | 7.025 | 650 |
| 620G | 7.35 | 7.025 | 7.675 | 650 |
| 620H | 8.00 | 7.675 | 8.325 | 650 |
| 620I | 8.65 | 8.325 | 8.975 | 650 |
| 620J | 9.30 | 8.975 | 9.625 | 650 |
| 620K | 9.95 | 9.625 | 10.275 | 650 |

Figure 7:
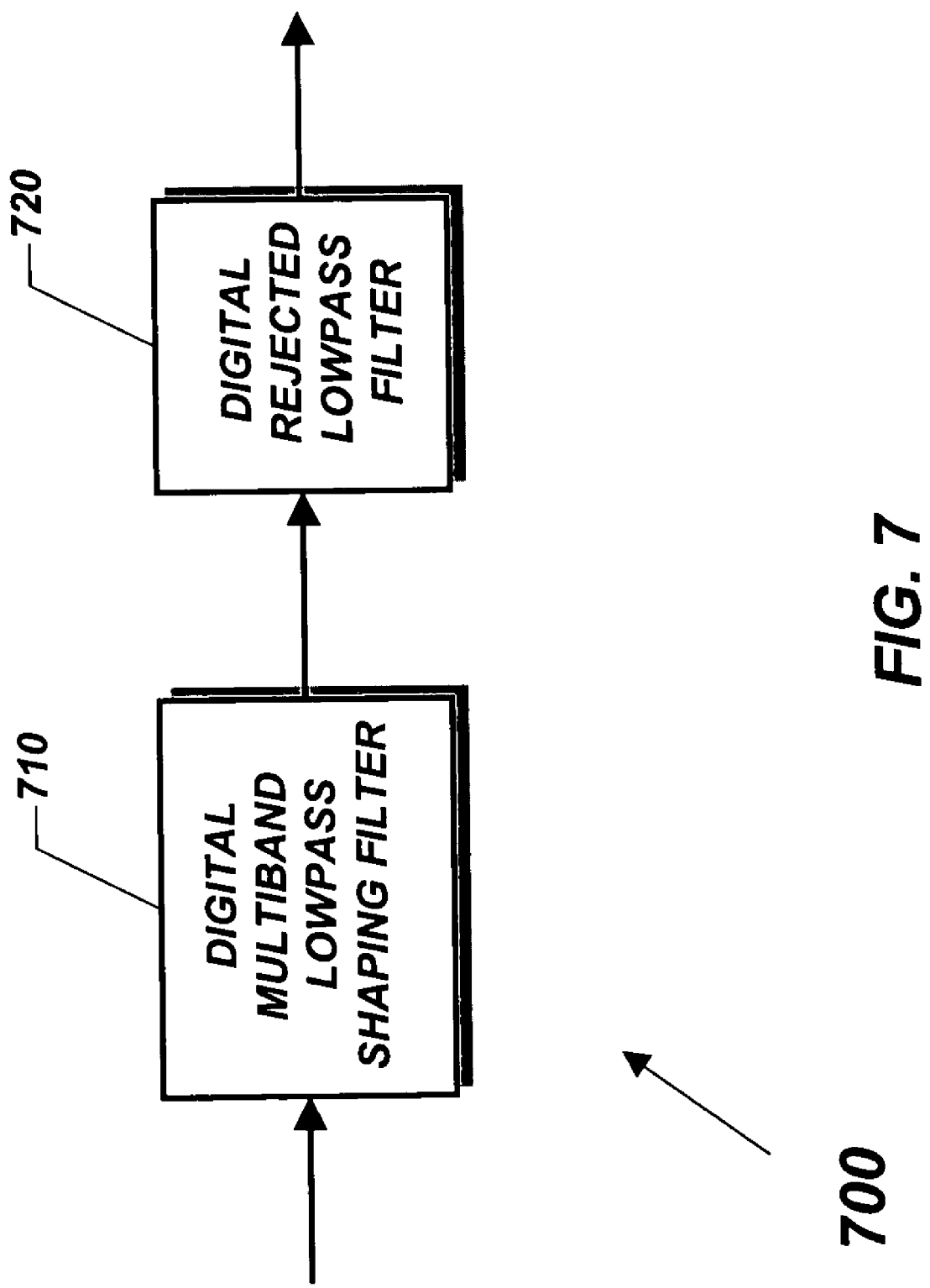
FIG. 7 is a block diagram of a digital cascaded FIR filter including a digital multiband FIR lowpass shaping filter and digital FIR rejected lowpass filter according to one embodiment.

In order to reduce the number of filter taps for the digital FIR lowpass shaping transmitter filter, an efficient design method 700 of the two cascaded filters may be used as shown in FIG. 7. The first filter 710 is referred to as the digital multiband lowpass-shaping filter. The second filter 720 is called the digital rejected lowpass filter. The combinations of the first digital FIR lowpass-shaping filter 710 and the second digital rejected lowpass filter 720 meet the frequency spectrum requirement of the transmitter spectrum mark 420 of the outdoor power spectrum density 400 as shown in FIG. 4.

Figure 8:
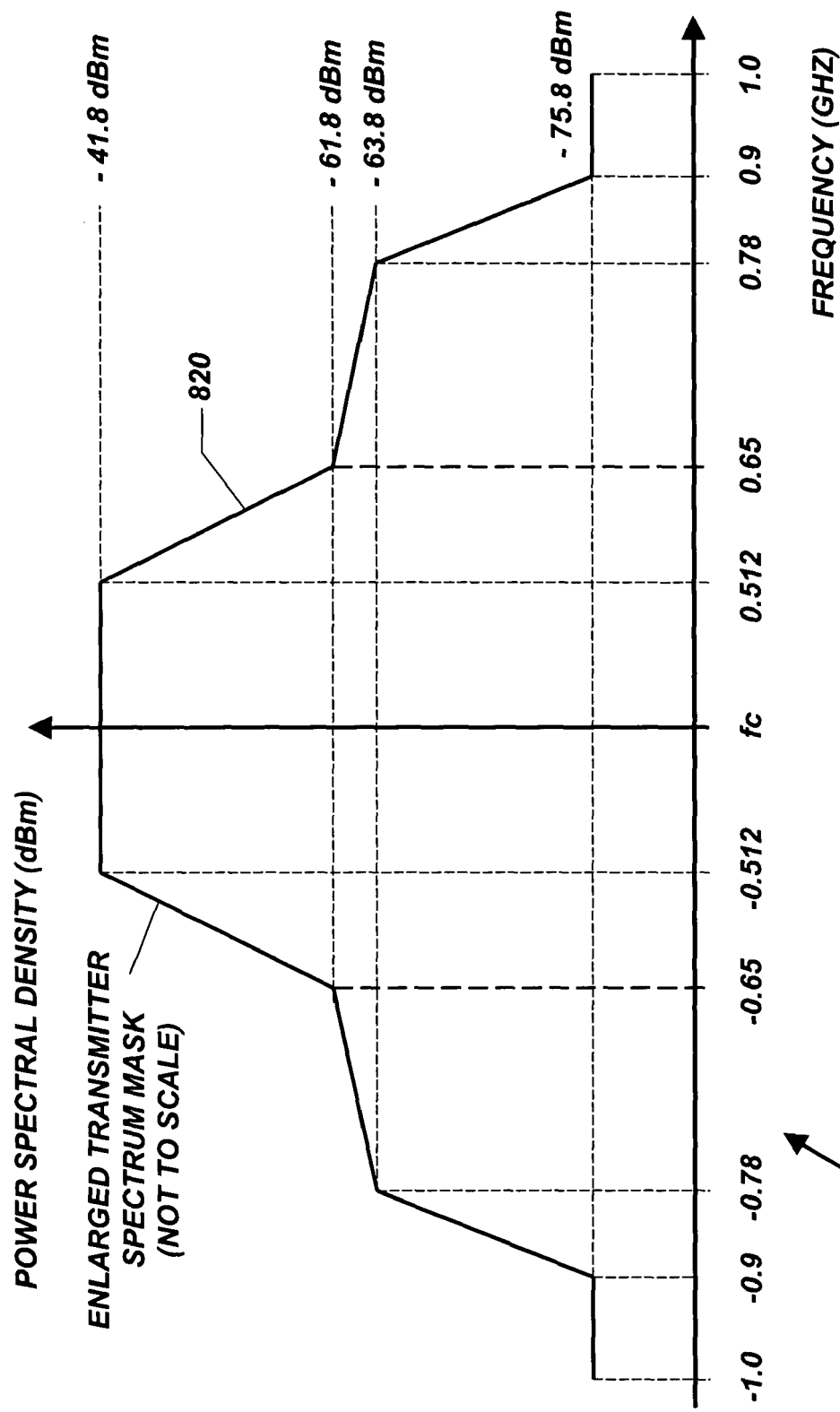
FIG. 8 is an enlarged transmitter spectrum mark of the outdoor power spectral density according to some embodiments.

Referring to FIG. 8, which is an enlarged transmitter spectrum mark 820 of the power spectral density 800 for the use of the digital multiband lowpass-shaping filter 710 according to some embodiments. The enlarged transmitter spectrum mark 820 is a double frequency bandwidth of the transmitter spectrum mask 420 of the outdoor power spectrum density 400 as shown in FIG. 4. The magnitudes (dBm) of the frequency response with an error of $\pm \delta_i$ (i=1, 2, 3, 4) for corresponding frequencies (GHz) are given by, $$(-41.8-\delta_i) \leq |H(f)| \leq (-41.8+\delta_1), \ |f-f_c| \leq 0.26, \quad (3)$$

$$|H(f)| \leq (-61.8+\delta_2), \ |f-f_c| = 0.325, \quad (4)$$

$$|H(f)| \leq (-63.8+\delta_3), \ |f-f_c| = 0.39, \quad (5)$$

$$|H(f)| \leq (-75.8+\delta_4), \ 0.45 \leq |f-f_c| \leq 0.5. \quad (6)$$

The enlarged transmitter spectrum mark 820 serves as a rule for designing a digital multiband lowpass-shaping transmitter filter for the multichannel modulation.

Figure 9:
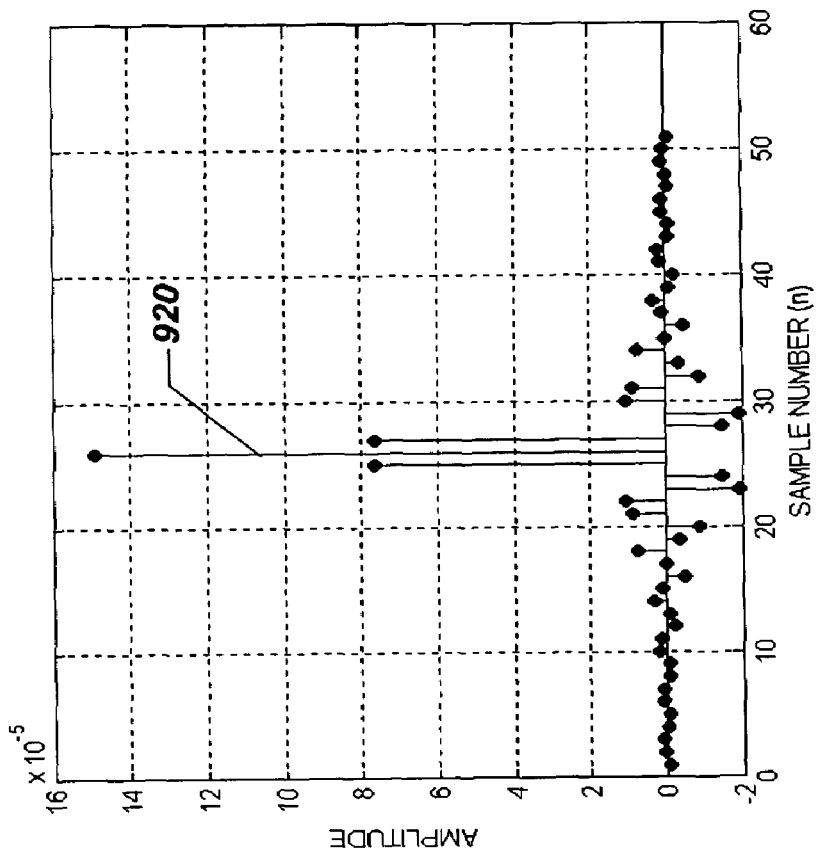
FIG. 9 is a frequency and impulse response of digital enlarged FIR lowpass shaping filter for use in the transmitter and/or receiver according to one embodiment.
Figure 9:
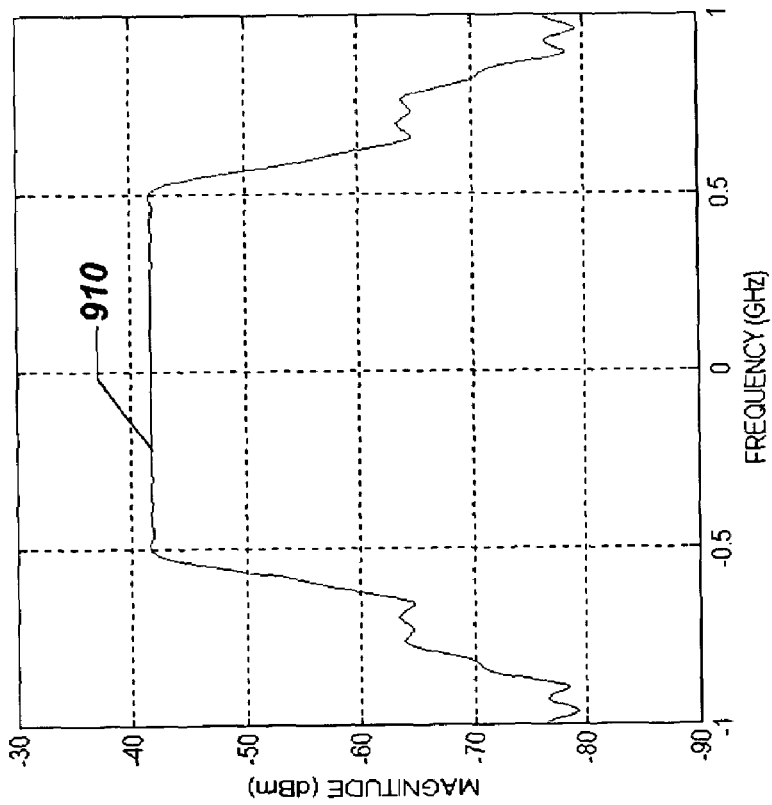

Referring to FIG. 9 is a frequency response (dBm) 910 and impulse response 920 of the digital enlarged lowpass-shaping transmitter 900 based on the enlarged transmitter spectrum mask 820 of the power spectrum density 800 in FIG. 8 according to one embodiment. This impulse response 920 of the digital enlarged lowpass-shaping filter is an even coefficient symmetric about h[0] at n=0 with a total of 51 filter coefficients. Table 4 lists all the enlarged filter coefficients.

TABLE 4

| Coefficients | Value |
| --- | --- |
| h[0] | 1.4905382621261000e-004 |
| h[−1], h[1] | 7.6680648491640600e-005 |
| h[−2], h[2] | −1.5178410889857596e-005 |
| h[−3], h[3] | −1.9246816367394734e-005 |
| h[−4], h[4] | 1.0575089944159355e-005 |
| h[−5], h[5] | 8.8048715073563623e-006 |
| h[−6], h[6] | −9.0052188618312217e-006 |
| h[−7], h[7] | −3.4989976830573730e-006 |
| h[−8], h[8] | 7.2999338857814008e-006 |
| h[−9], h[9] | 1.3688399180492002e-007 |
| h[−10], h[10] | −4.7454858992689909e-006 |
| h[−11], h[11] | 8.2887506682015732e-007 |
| h[−12], h[12] | 3.1263713712333295e-006 |
| h[−13], h[13] | −1.0335732862655074e-006 |
| h[−14], h[14] | −2.2027524428255945e-006 |
| h[−15], h[15] | 1.1349107902073455e-006 |
| h[−16], h[16] | 1.5322309394969939e-006 |
| h[−17], h[17] | −1.1207672214842861e-006 |
| h[−18], h[18] | −1.0179971177063034e-006 |
| h[−19], h[19] | 9.9455220021528296e-007 |
| h[−20], h[20] | 7.1533195938216734e-007 |
| h[−21], h[21] | −8.7419141944548621e-007 |
| h[−22], h[22] | −5.5965129818442147e-007 |
| h[−23], h[23] | 9.0256580368692782e-007 |
| h[−24], h[24] | 2.8080835334095955e-007 |
| h[−25], h[25] | −7.3657896684832648e-007 |

Figure 10:
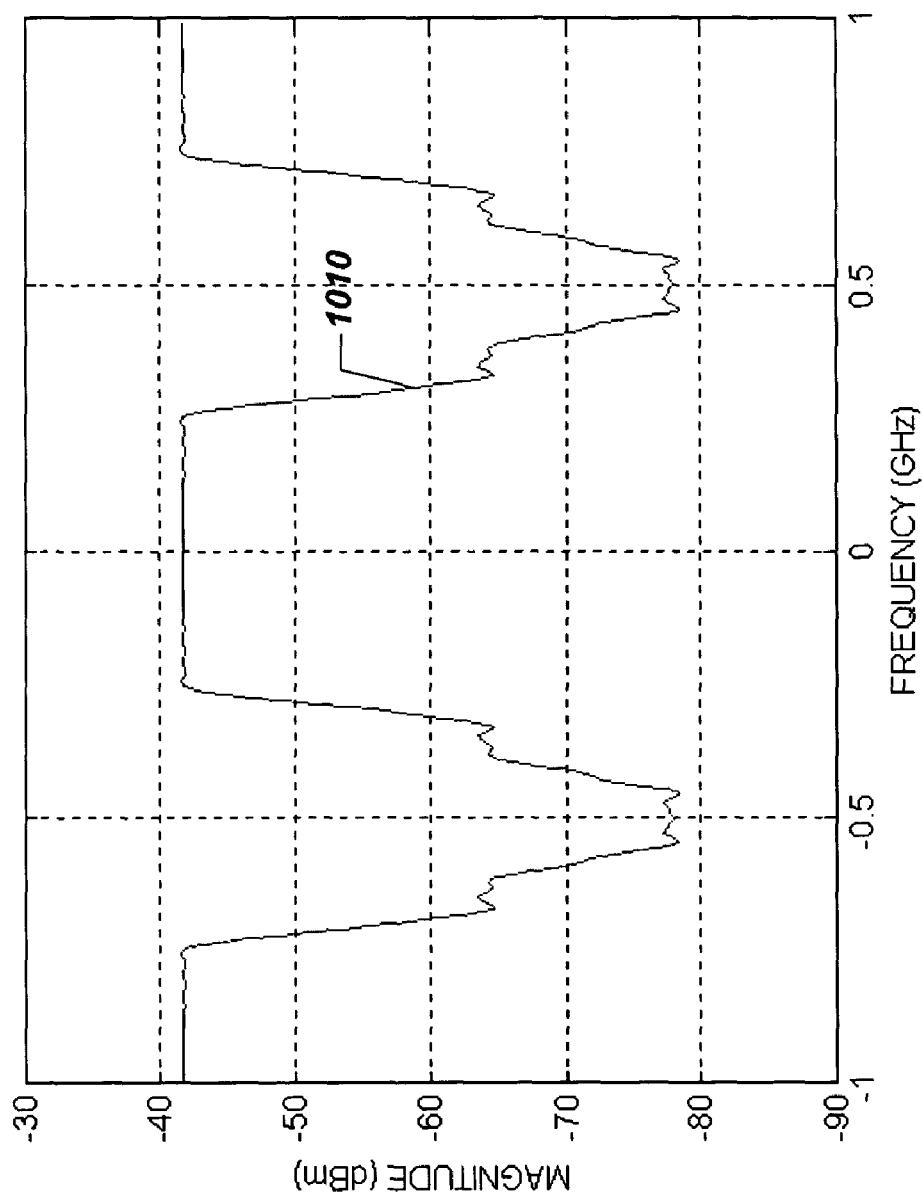
FIG. 10 is a frequency response of digital multiband FIR lowpass shaping filter with image response for use in the transmitter and/or receiver according to one embodiment.

Referring to FIG. 10 is a frequency response (dBm) 1010 of the digital multiband lowpass-shaping transmitter filter according to some embodiments. The center frequency band shaping of the frequency response 1010 meets the requirement of the transmitter spectrum mark 420 of the power spectrum density 400 as shown in FIG. 4. This digital multiband lowpass-shaping filter has a symmetric image band that is created by inserting one zero in between every two filter coefficients of the digital enlarged lowpass shaping filter. In other words, the digital multiband lowpass-shaping filter 1010 has 51 filter taps and 50 zeros. The filter does not need to implement the zero coefficients. As a result, the computation complexity of implementing this digital multiband lowpass-shaping filter 1010 is 26 multiplications and 50 additions.

Figure 11:
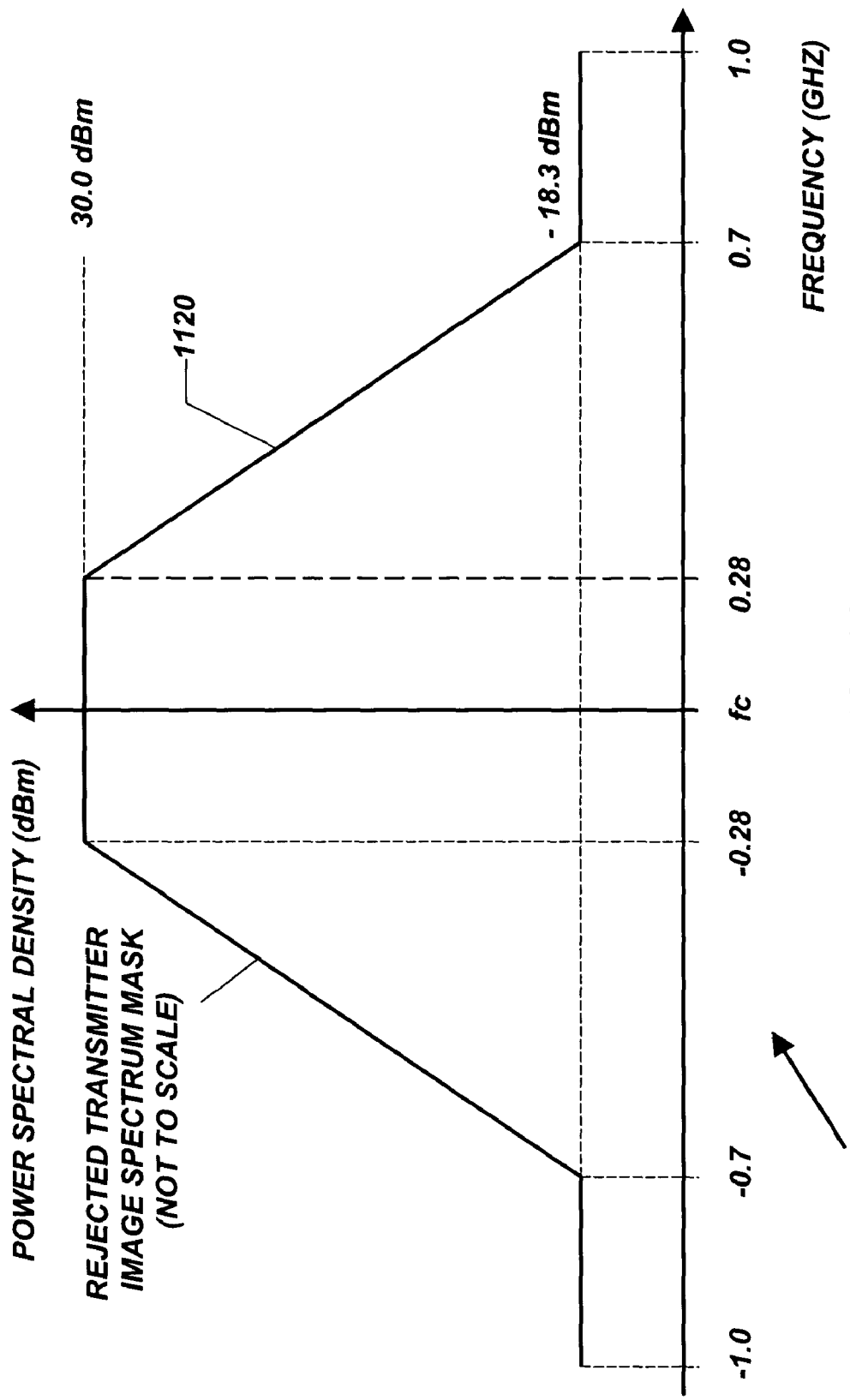
FIG. 11 is a rejected transmitter image spectrum mark of the outdoor power spectral density according to some embodiments.

FIG. 11 is a rejected transmitter image spectrum mark 1120 of the power spectral density 1100 for the use to eliminate the image bands of the digital multiband lowpass-shaping filter 1010 according to some embodiments. The magnitudes (dBm) of the frequency response with an error of $\pm \delta_i$ (i=1, 2) for corresponding frequencies (GHz) are given by, $$(30.0-\delta_1) \leq |H(f)| \leq (30+\delta_1), \ |f-f_c| \leq 0.28, \quad (3)$$

$$|H(f)| \leq (-18.3+\delta_2), \ 0.7 \leq |f-f_c| \leq 1. \quad (6)$$

The rejected transmitter image spectrum mark 1120 serves as a rule for designing a second digital rejected lowpass filter 720 as shown in FIG. 7.

Figure 12:
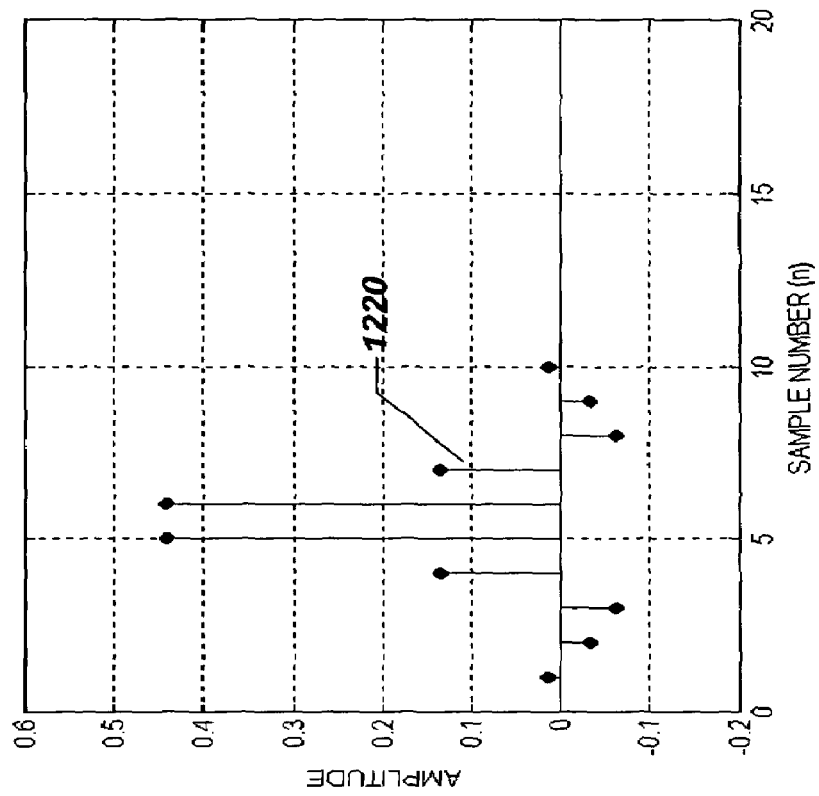
FIG. 12 is a frequency and impulse response of digital FIR rejected filter to eliminate the image response for use in the transmitter and/or receiver according to one embodiment.
Figure 12:
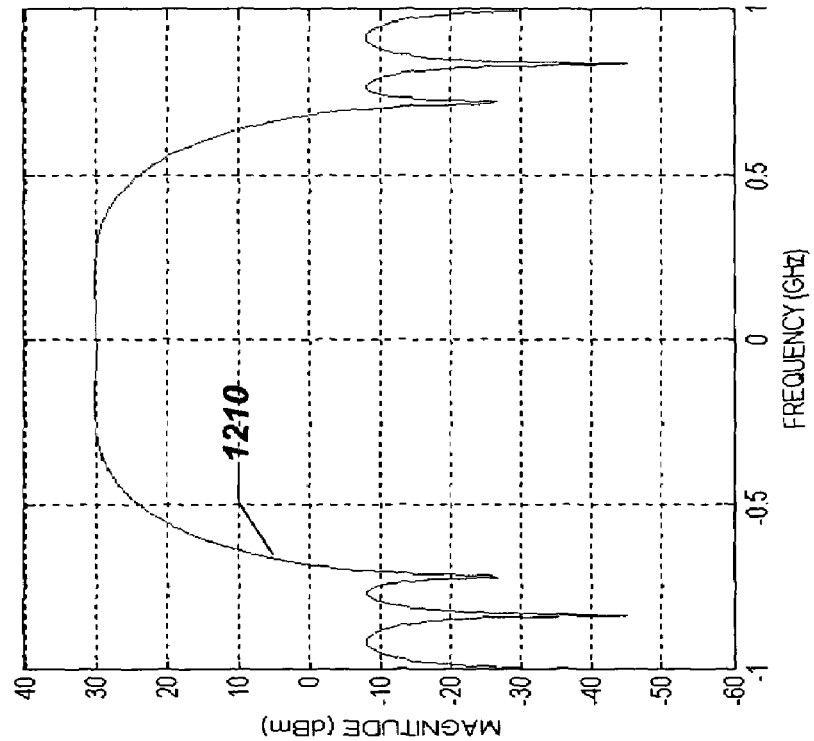

Referring to FIG. 12 is a frequency response 1210 and impulse response 1220 of the digital rejected lowpass filter according to some embodiments. This digital filter is even symmetric with 10 filter coefficients. The computation complexity of this digital filter is 5 multiplications and 9 additions. Table 5 lists all the filter coefficients of the digital rejected lowpass filter.

TABLE 5

| Coefficients | Value |
| --- | --- |
| h[−1], h[1] | 4.4130491021078377e-001 |
| h[−2], h[2] | 1.3499284445782986e-001 |
| h[−3], h[3] | −6.2314200832043407e-002 |
| h[−4], h[4] | −3.3159624664790568e-002 |
| h[−5], h[5] | 1.2925496194348735e-002 |

Figure 13:
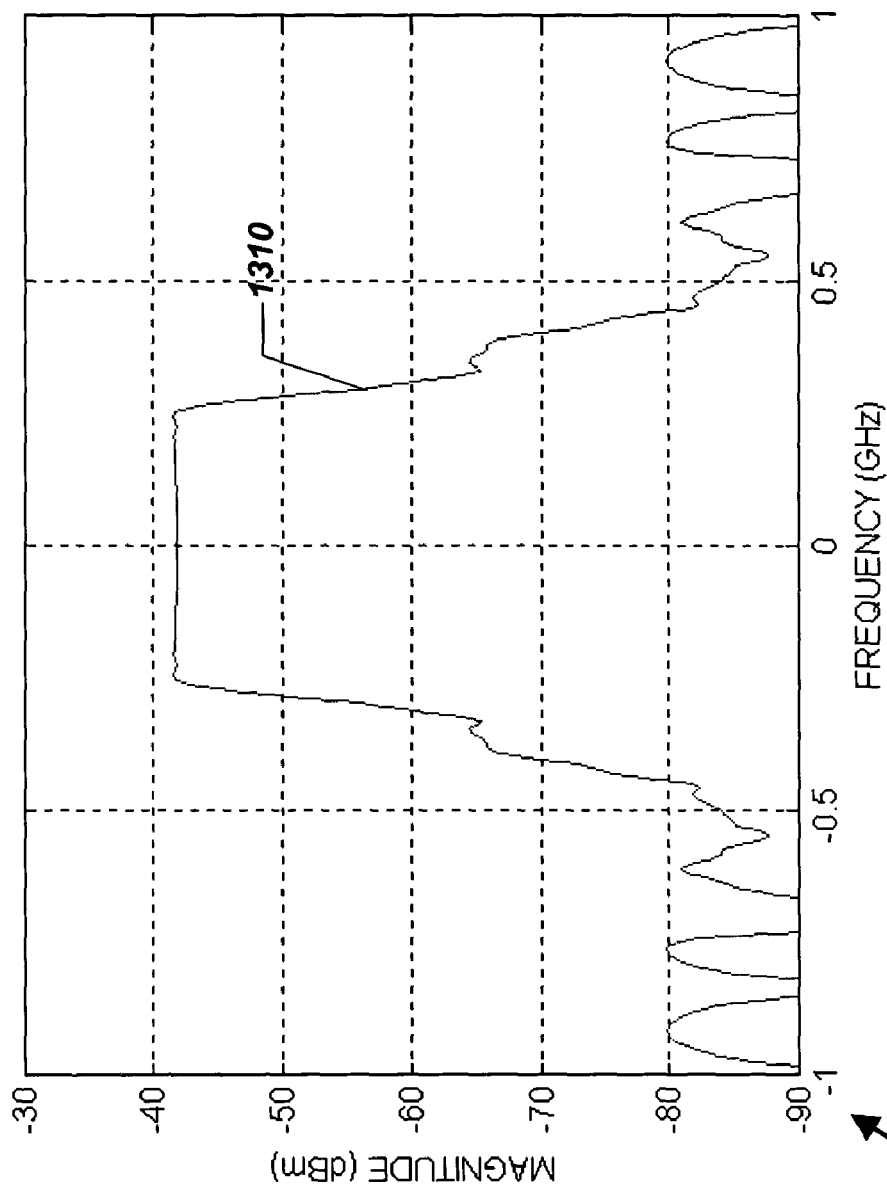
FIG. 13 is a frequency response of digital cascaded FIR filter of combining the digital multiband FIR lowpass shaping filter and the digital FIR rejected filter.

Now referring to FIG. 13 is a frequency response of the digital cascaded FIR filter 1310 by combining the digital multiband lowpass-shaping filter 1010 and the digital rejected lowpass filter 1210. The result of this digital cascaded FIR filter 1310 exactly meet the requirement of the transmitter spectrum mask 420 of the power spectrum density 400 in FIG. 4.

The digital cascaded FIR filter 1310 of the digital multiband lowpass-shaping filter 1010 and the digital rejected lowpass filter 1210 has a total of 28 multiplications and 53 additions. Comparing with the single digital FIR lowpass-shaping filter 510, the digital cascaded FIR filter 1310 can save the computation complexity up to 41.67% of the multiplications and 43.62% additions. This leads to save the processing power, memory, and silicon area for the multichannel filter-based outdoor handheld UWB communication device.

Figure 14:
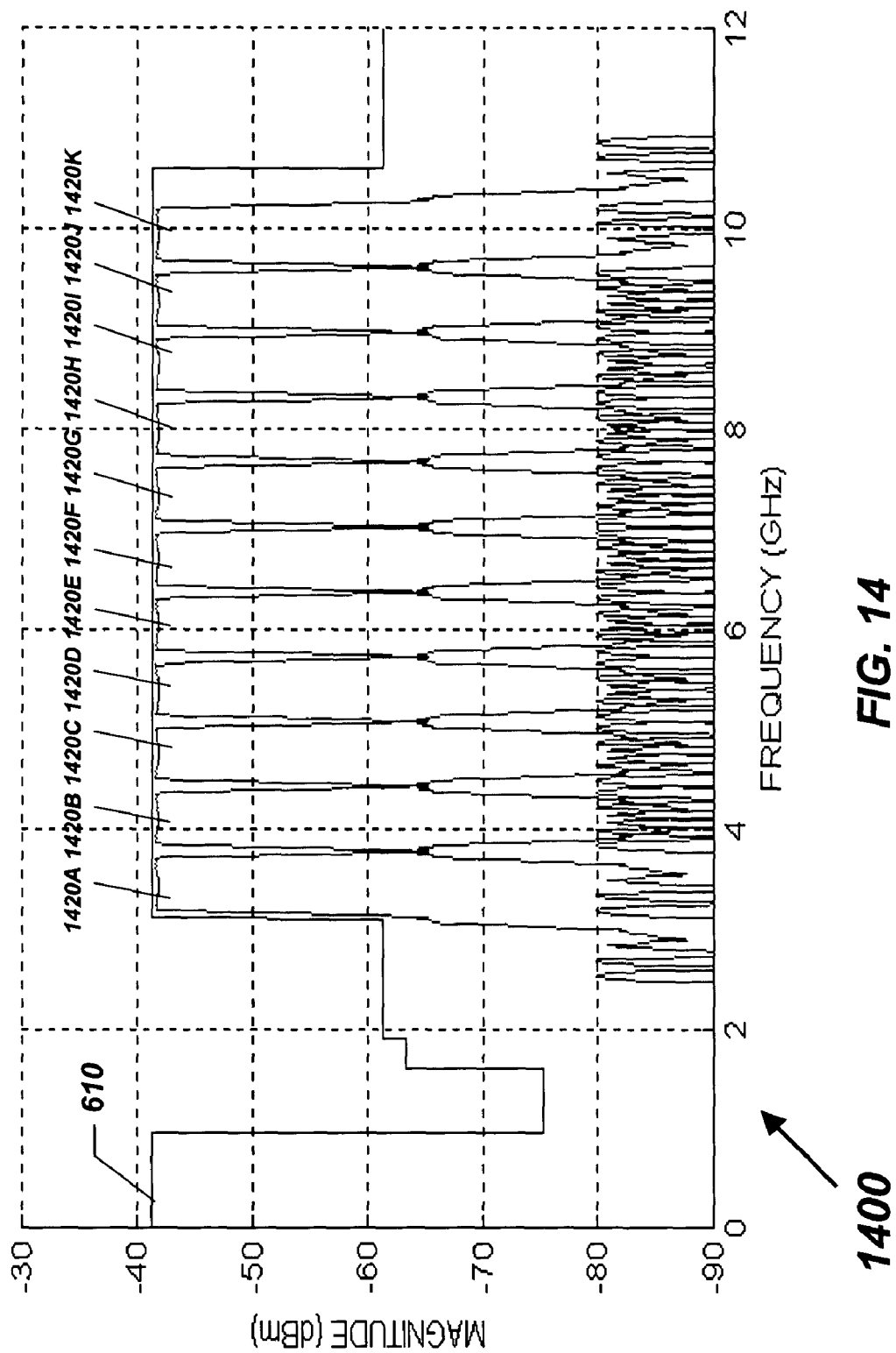
FIG. 14 is a frequency spectrum of 11 multichannel spectrums using the digital FIR cascaded filter and the outdoor FCC outdoor emission limit according to some embodiments.

Referring to FIG. 14 is an output of multichannel frequency spectrums (dBm) 1400 with multi-carriers, which are generated by using the digital cascaded FIR filter 1310, including 11-transmitter channel spectrums 1420A-1420K along with the outdoor FCC emission limitation 610 according to some embodiments. Each channel frequency bandwidth is 650 MHz with different carrier frequencies, and is fitted under the outdoor FCC emission limitation 610.

Figure 15:
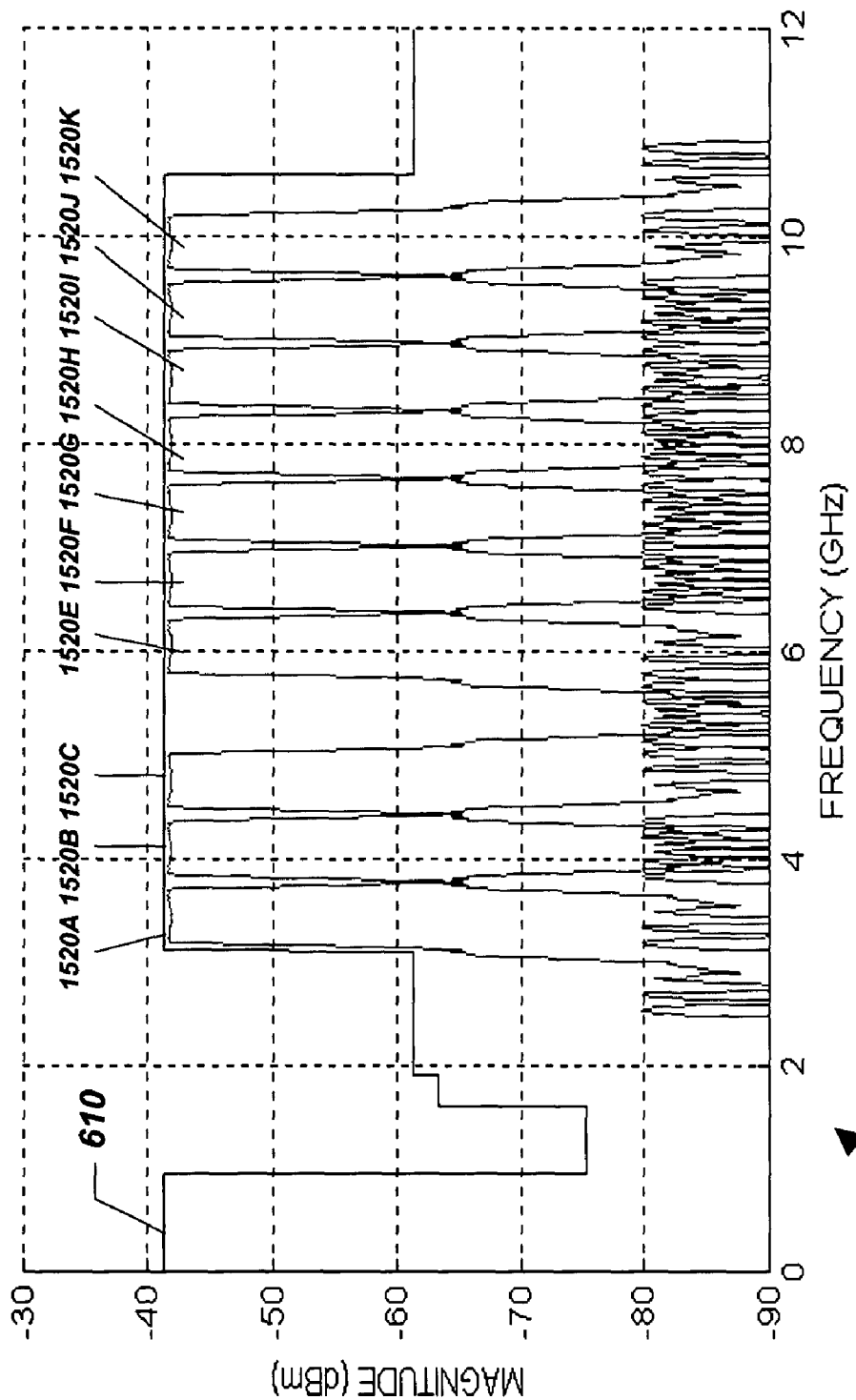
FIG. 15 is a frequency spectrum including 10-multichannel spectrums (without the fourth channel) and the outdoor FCC emission limit according to some embodiments.

Referring to FIG. 15 is an output of multichannel frequency spectrums 1500 with multi-carriers including 10-transmitter channel spectrums 152064A-1520C, 1520E-1520K, along with the outdoor FCC emission limitation 610 according to some embodiments. The fourth channel does not exist with frequency range from 5.075 GHz to 5.725 GHz in the frequency spectrums 1500. By not transmitting the fourth channel, the interference between the outdoor handheld UWB communication devices and WLAN 802.11a lower band can be avoided since the WLAN 802.11a lower band is in the frequency range from 5.15 GHz to 5.35 GHz, thereby resulting in coexistences.

Figure 16:
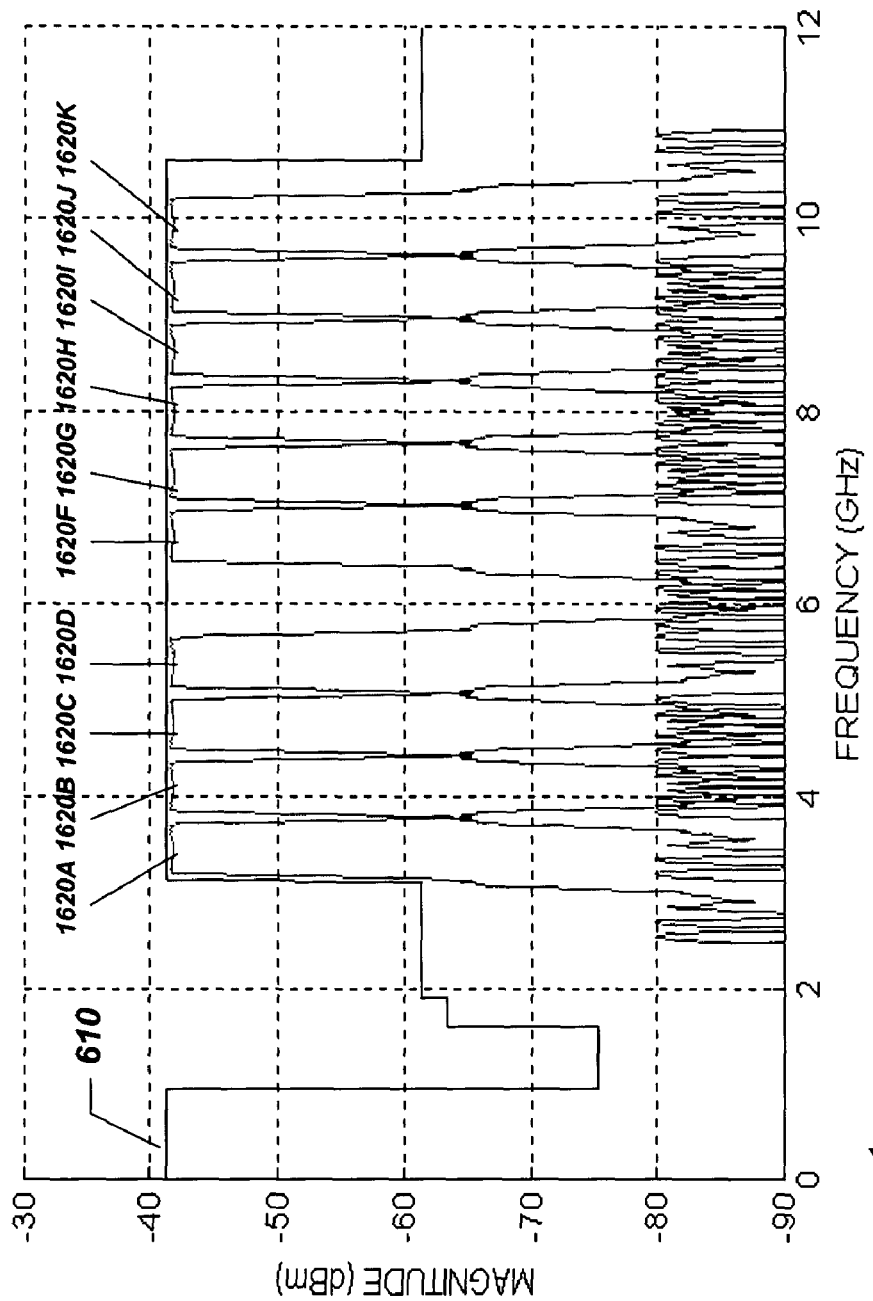
FIG. 16 is a frequency spectrum including 10-multichannel spectrums (without the fifth channel) and the outdoor FCC emission limit according to some embodiments.

Referring to FIG. 16 is an output of multichannel frequency spectrums 1600 with multi-carriers including 10 transmitter channel spectrums 1620A-1620D, 1620F-1620K, along with the outdoor FCC emission limitation 610 according to some embodiments. There is not fifth channel with frequency range from 5.725 GHz to 6.375 GHz in the frequency spectrums 1600. By not transmitting the fifth channel, the interference between the outdoors handheld UWB communication devices and WLAN 802.11a upper band can be eliminated. This is because the WLAN 802.11a upper band is in the frequency range from 5.725 GHz to 5.825 GHz, thereby resulting in UWB and WLAN 802.11a coexistences.

Figure 17:
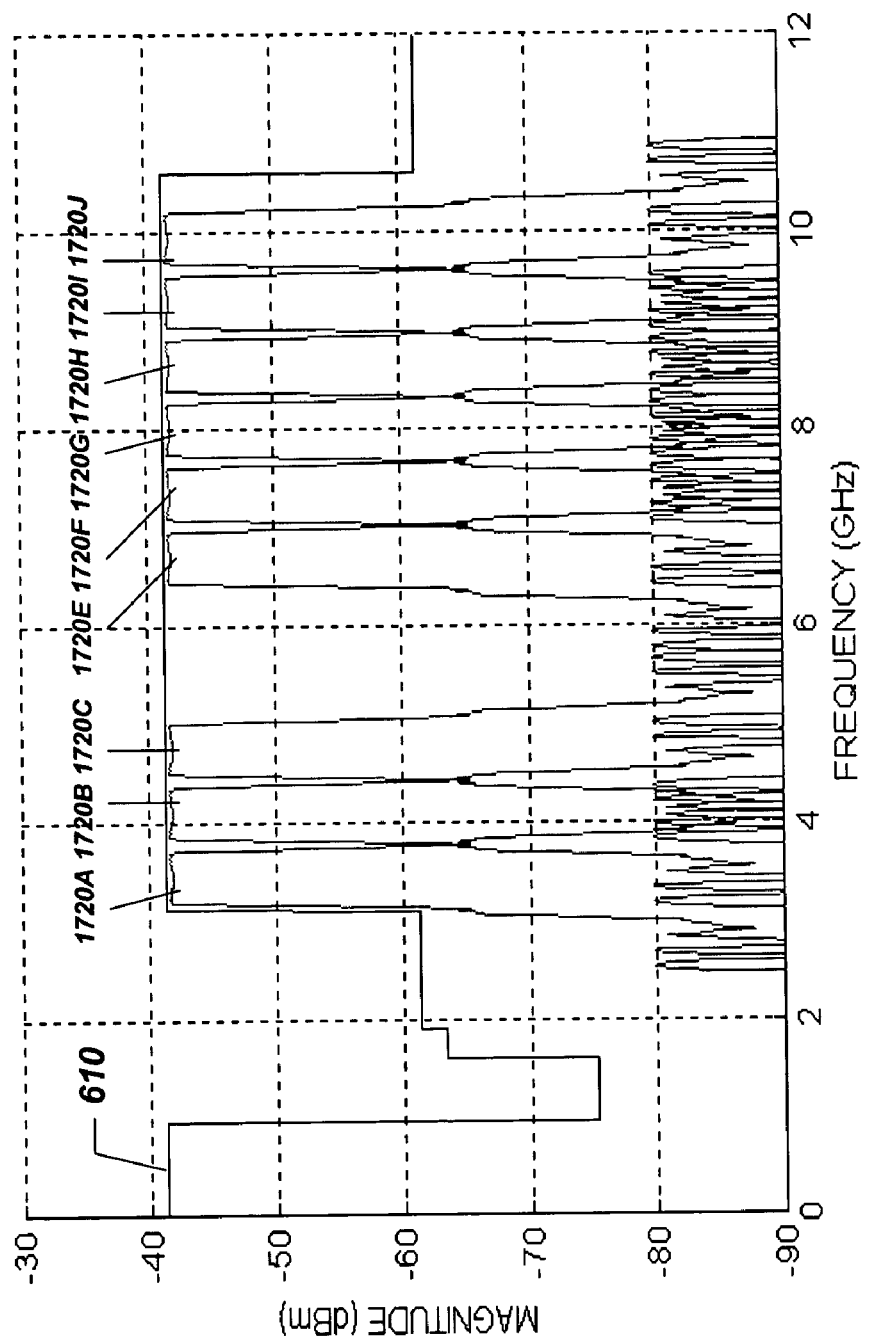
FIG. 17 is a frequency spectrum including 9-multichannel spectrums (without the fourth and fifth channel) and the outdoor FCC emission limit according to some embodiments.

Now referring to FIG. 17 is an output of multichannel frequency spectrums 1700 with multi-carriers including 9-transmitter channel spectrums 1720A-1720C, 1720F-1720K, along with the outdoor FCC emission limitation 610 according to some embodiments. The frequency spectrum 1700 does not include the fourth and fifth channels with frequency range from 5.075 GHz to 6.375 GHz. By not transmitting the fourth and fifth channels, the interference between the outdoors handheld UWB communication devices and WLAN 802.11a lower and upper bands can be avoided. This is because the WLAN 802.11a lower and upper bands are in the frequency ranges from 5.150 GHz to 5.350 GHz and from 5.725 GHz to 5.825 GHz, respectively. As a result, the interference can be avoided between the outdoor handheld UWB and WLAN 802.11a by no transmitting the fourth and fifth channels of multichannel filter-based outdoor handheld UWB communication device.

While the present inventions have been described with respect to a limited number of embodiments, those skilled in the art will appreciate numerous modifications and variations therefrom. It is intended that the appended claims cover all such modifications and variations as fall within the true spirit and scope of these present inventions.

What is claimed is:

1. A multichannel filter-based handheld ultra Wideband (UWB) communication transmitter comprising:
    A convolution encoder coupled to a block interleaver;
    the block interleaver coupled to a multichannel pseudo-random (PN) sequence mapping;
    the multichannel PN sequence mapping coupled to a digital UWB transmitter filter system;
    the digital UWB transmitter filter system coupled to a digital-to-analog (D/A) converter;
    the D/A converter coupled to a multichannel-based multicarrier modulator;
    the multichannel-based multicarrier modulator coupled to a power amplifier (PA);
    a PN sequence look-up table coupled to the multichannel PN sequence mapping;
    a multichannel control coupled to the multichannel PN sequence mapping and coupled to the multichannel-based multicarrier modulator; and
    a clock control coupled to the digital UWB transmitter filter system, the D/A converter, and the multichannel-based multicarrier modulator.

2. The multichannel filter-based handheld UWB communication transmitter of claim 1 wherein the digital UWB transmitter filter system is used to generate multichannel UWB signals for outdoor operations.

3. The multichannel filter-based handheld UWB communication transmitter of claim 1 wherein said digital UWB transmitter filter system can produce a set of transmitted data rates with scalability by controlling multichannel UWB signals.

4. The multichannel filter-based handheld UWB communication transmitter of claim 1 wherein said digital UWB transmitter filter system is either a digital UWB FIR lowpass-shaping filter or a digital UWB cascaded FIR lowpass-shaping filter.

5. The multichannel filter-based handheld UWB communication transmitter of claim 4 wherein the digital UWB FIR lowpass-shaping filter further comprises
    a lowpass band 0-0.26 (GHz);
    a first transition band 0.26-0.325 (GHz);
    a second transition band 0.325-0.39 (GHz);
    a third transition band 0.39-0.45 (GHz); and
    a stop band 0.45-0.5 (GHz).

6. The multichannel filter-based handheld UWB communication transmitter of claim 5 wherein said digital UWB FIR lowpass-shaping filter has 83 filter coefficients.

7. The multichannel filter-based handheld UWB communication transmitter of claim 4 wherein said digital UWB cascaded FIR lowpass-shaping filter includes a digital UWB multiband FIR lowpass-shaping filter and a digital UWB FIR rejected lowpass filter.

8. The multichannel filter-based handheld UWB communication transmitter of claim 7 wherein said digital UWB multiband FIR lowpass-shaping filter is created by a digital UWB enlarged FIR lowpass shaping filter of inserting a zero in between the filter coefficients.

9. The multichannel filter-based handheld UWB communication transmitter of claim 8 wherein said digital UWB enlarged FIR lowpass shaping filter comprises:
    a lowpass band 0-0.512 (GHz);
    a first transition band 0.512-0.65 (GHz);
    a second transition band 0.65-0.78 (GHz);
    a third transition band 0.78-0.9 (GHz); and
    a stop band 0.9-1.0 (GHz).

10. The multichannel filter-based handheld UWB communication transmitter of claim 9 wherein said digital UWB enlarged FIR lowpass shaping filter has 51 filter coefficients.

11. The multichannel filter-based handheld UWB communication transmitter of claim 7 wherein said digital UWB FIR rejected lowpass filter has frequency bandwidths comprising:
    a lowpass band 0-0.28 (GHz);
    a transition band 0.28-0.7 (GHz); and
    a stop band 0.7-1.0 (GHz).

12. The multichannel filter-based handheld UWB communication transmitter of claim 11 wherein said digital UWB FIR rejected lowpass filter has 10 filter coefficients.

13. The multichannel filter-based handheld UWB communication transmitter of claim 4 wherein the digital UWB FIR lowpass-shaping filter and the digital UWB cascaded FIR lowpass-shaping filter can be used to generate equivalently transmitted signals, which meet an outdoor UWB transmitter spectrum mask.

14. The multichannel filter-based handheld UWB communication transmitter of claim 4 wherein said multichannel control can control the multichannel-based multicarrier modulator to turn off anyone of the transmitting UWB channels during outdoor operations.

15. The multichannel filter-based handheld UWB communication transmitter of claim 14 wherein said multichannel control coupled to said multichannel-based multicarrier modulator can be used to avoid the interference with Wireless Local Area Network (WLAN) devices by not transmitting UWB signals on one and/or two transmitter channels.

16. A multichannel filter-based handheld Ultra Wideband (UWB) communication receiver comprising:

a lower noise amplifier (LNA) coupled to a multichannel-based multicarrier downconverter;

the multichannel-based multicarrier downconverter coupled to an analog-to-digital (A/D) converter;

the A/D converter coupled to a digital UWB multichannel receiver filter;

the digital UWB multichannel receiver filter coupled to a Rake receiver that is connected with a channel estimator and an equalizer;

the channel estimator coupled to the equalizer;

the equalizer coupled to a dispreading of pseudorandom (PN) sequence and demapping, which is connected to a block deinterleaver followed by a decoder;

a synchronization and time control coupled to the multichannel-based multicarrier downconverter, the digital UWB multichannel receiver filter, and the Rake receiver;

a PN sequence look-up table is coupled to the Rake receiver and the dispreading of PN sequence and demapping; and a multichannel control is connected to the multichannel-based multicarrier downconverter and the dispreading of PN sequence and demapping.

17. The multichannel filter-based handheld UWB communication receiver of claim 16 wherein said digital UWB multichannel receiver filter has a filter spectrum mask, including a lowpass band, a first transition band, a second transition band, a third transition band, and a stop band.

18. The multichannel filter-based handheld UWB communication receiver of claim 16 wherein said digital UWB multichannel receiver filter is either a digital UWB lowpass FIR filter or a digital UWB cascaded lowpass FIR filter.

19. The multichannel filter-based handheld UWB communication receiver of claim 16 wherein said digital UWB multichannel receiver filter can be used to filter all of multichannel UWB signals at different multicarrier frequencies.

* * * * *